(12) United States Patent
Doesburg et al.

(10) Patent No.: US 6,881,764 B2
(45) Date of Patent: Apr. 19, 2005

(54) POLYURETHANE COMPOSITION WITH GLASS CULLET FILLER AND METHOD OF MAKING SAME

(75) Inventors: Van I. Doesburg, Dalton, GA (US); Milton Bradley Giddens, Adairsville, GA (US)

(73) Assignee: Textile Rubber & Chemical Company, Inc., Dalton, GA (US)

( * ) Notice: Subject to any disclaimer, the term of this patent is extended or adjusted under 35 U.S.C. 154(b) by 0 days.

(21) Appl. No.: 10/007,178

(22) Filed: Dec. 4, 2001

(65) Prior Publication Data

US 2003/0114625 A1 Jun. 19, 2003

(51) Int. Cl.$^7$ .......................... C08K 3/34; C08G 18/00; C08G 18/16; C08J 9/00; C08J 9/04
(52) U.S. Cl. .................. 521/122; 521/155; 521/170; 524/492; 524/494; 524/701; 524/789; 528/48; 528/55; 528/56; 528/57
(58) Field of Search ................................ 521/122, 155, 521/170; 524/492, 494, 701, 789; 528/48, 55, 56, 57

(56) References Cited

U.S. PATENT DOCUMENTS 3,931,064 A * 1/1976 Ray et al. .................... 521/155
4,863,518 A * 9/1989 Blount ......................... 106/74
6,284,186 B1 9/2001 Hansen

OTHER PUBLICATIONS

Internet advertisement "Recycled Glass," by Universal Ground Cullet, Inc., at <www.groundcullet.com>, last visited Nov., 2001.
Internet article "Processed Ground Cullet 'Glass,'" by Universal Ground Cullet, Inc., at <www.groundcullet.com>, last visited Nov., 2001.
Internet article "Glass Applications," by Universal Ground Cullet, Inc., at <www.groundcullet.com>, last visited Nov., 2001.
Brochure entitled "Respirator Health Aspects of Ground Glass vs. Ground Silica," a ReTAP Technology Brief, by Clean Washington Center.
Brochure entitled "Strategic Materials, Inc. The Nation's Largest Producer of Quality Glass Cullet and Specialty Powders," by Strategic Materials Inc., 1999.

* cited by examiner

*Primary Examiner*—Rabon Sergent
(74) *Attorney, Agent, or Firm*—Kilpatrick Stockton LLP

(57) ABSTRACT

There is disclosed a polyurethane composition with a glass cullet filler. The composition comprises at least one polyol, an isocyanate, a catalyst and glass cullet. The glass cullet has an average particle size of not greater than 100 mesh and not less than 325 mesh. A method of producing a polyurethane composition with a glass cullet filler is also disclosed.

34 Claims, No Drawings

POLYURETHANE COMPOSITION WITH GLASS CULLET FILLER AND METHOD OF MAKING SAME

FIELD OF INVENTION

The present invention relates generally to filled polyurethane compositions, and, more specifically, to polyurethane compositions containing glass cullet as a filler.

BACKGROUND OF THE INVENTION

Polyurethane compositions are well known in the art. Polyurethane compositions can be solid or cellular, flexible or rigid. Solid polyurethane compositions are used for many applications, such as insulative structural members and textile coatings, such as carpet backing coatings to adhere tufts to primary backing materials or to adhere secondary backing materials to primary backing materials. Cellular polyurethane, such as foamed or frothed polyurethane, is used for items such as cushions and textile coatings, such as integrally attached cushions for carpet.

With all types of polyurethane compositions fillers can be used to reduce the cost per unit volume of the polyurethane compositions. Fillers that have been known for use in polyurethane compositions include, clays, wood flour, cork dust, cotton flock, shredded or finely powdered cornsilks, finely ground nut shells, fly ash and the like.

Recently, there has been a move to include recycled products as a portion of new products. U.S. Pat. Nos. 6,313,207; 6,310,114; 6,306,976; and 6,284,186 disclose the use of various types of glass with different plastic compositions. However, to date, efforts to incorporate glass cullet with polyurethane compositions have not been entirely satisfactory. Therefore, a need exists for a polyurethane composition that includes a recycled product.

SUMMARY OF THE INVENTION

The present invention satisfies the above-described needs by providing an improved polyurethane composition including recycled glass cullet. The improved polyurethane compositions of the present invention comprise at least one polyol; an isocyanate; a catalyst; and glass cullet. The glass cullet has an average particle size of not greater than 100 mesh and not less than 325 mesh.

In an alternate embodiment, the present invention comprises a filled polyurethane composition that comprises polyurethane-forming components and glass cullet having an average particle size such that the composition has a viscosity of less than approximately 13,000 cps.

The present invention also comprises a method of forming a polyurethane composition. The method comprises the step of combining at least one polyol, an isocyanate, a catalyst, and glass cullet having an average particle size of not greater than 100 mesh and not less than 325 mesh.

In an alternate embodiment, the present invention comprises a method of forming a filled polyurethane composition. The method comprises combining with polyurethane-forming components glass cullet having an average particle size such that said composition has a viscosity of less than approximately 13,000 cps.

Accordingly, it is an object of the present invention to provide an improved polyurethane composition and an improved method for forming a polyurethane composition.

Another object of the present invention is to provide an improved filled polyurethane composition and a method of forming a filled polyurethane composition.

A further object of the present invention is to provide a filled polyurethane composition that includes a recycled product.

A further object of the present invention is to provide a filled polyurethane composition that includes glass cullet as a filler.

These and other objects, features and advantages of the present invention will become apparent after a review of the following detailed description of the disclosed embodiments and the appended claims.

DETAILED DESCRIPTION OF THE DISCLOSED EMBODIMENTS

The present invention relates to polyurethane compositions including glass cullet as a filler. Glass cullet is glass that is broken or ground into relatively smaller pieces. Generally speaking, glass cullet is made by grinding recycled glass into a desired particle size. Glass cullet can range in particle size from approximately ⅝ inch to very fine powders, such as −325 mesh. Glass powders have been known to be useful as fillers for paint, stucco and plastic products.

Glass cullet is typically made from post-consumer glass; i.e., recycled glass from consumer applications. There are essentially six sources for post-consumer glass cullet: plate glass (also know as soda lime glass), E. glass, borosilicate glass, flint glass (also known as bottle glass), amber glass (also known as bottle glass), emerald glass (also known as bottle glass). Each of the foregoing different types of glass have different chemical compositions. The approximate chemical composition of each of the foregoing types of glass is shown in Tables I–VI below.

TABLE I

Plate Glass (Soda Lime)

| Chemical | % by Weight |
|---|---|
| SiO | 73.25 |
| Na$_2$O | 13.46 |
| CaO | 8.58 |
| MgO | 3.77 |
| Fe$_2$O$_3$ | 0.356 |
| Al$_2$O$_3$ | 0.28 |
| SO$_2$ | 0.19 |
| K$_2$O | 0.011 |
| PbO | 0.0037 |
| Cr$_2$O$_3$ | 0.0023 |

Plate glass has a softening point of approximately 724° C. or 1335° F.

TABLE II

E. Glass

| Chemical | % by Weight |
|---|---|
| SiO | 54.39 |
| CaO | 18.1 |
| Al$_2$O$_3$ | 14.2 |
| B$_2$O$_3$ | 6.73 |
| MgO | 4.51 |
| MgO | 1.04 |
| Na$_2$O | 0.57 |
| TiO$_2$ | 0.36 |
| K$_2$O | 0.10 |

E. glass has a softening point of approximately 852° C. or 1565° F.

TABLE III

| Borosilicate Glass | |
|---|---|
| Chemical | % by Weight |
| $SiO$ | 80.58 |
| $B_2O_3$ | 12.4 |
| $Na_2O$ | 4.13 |
| $Al_2O_3$ | 2.26 |
| $Fe_2O_3$ | 0.38 |
| $CaO$ | 0.11 |
| $K_2O$ | 0.06 |
| $Cl$ | 0.051 |
| $ZrO_2$ | 0.034 |

Borosilicate glass has a softening point of approximately 819° C. or 1506° F.

TABLE IV

| Flint Glass (Bottle Glass) | |
|---|---|
| Chemical | % by Weight |
| $SiO$ | 73.21 |
| $Na_2O$ | 13.45 |
| $CaO$ | 10.32 |
| $Al_2O_3$ | 1.34 |
| $MgO$ | 1.04 |
| $K_2O$ | 0.40 |
| $SO_2$ | 0.16 |
| $Fe_2O_3$ | 0.081 |
| $Cr_2O_3$ | 0.0026 |

Flint glass has a softening point of approximately 732° C. or 1349° F.

TABLE V

| Amber Glass (Bottle Glass) | |
|---|---|
| Chemical | % by Weight |
| $SiO$ | 72.45 |
| $Na_2O$ | 13.01 |
| $CaO$ | 10.48 |
| $Al_2O_3$ | 1.95 |
| $MgO$ | 0.68 |
| $K_2O$ | 0.44 |
| $Fe_2O_3$ | 0.31 |
| $SO_2$ | 0.08 |

Amber glass has a softening point of approximately 728° C. or 1342° F.

TABLE VI

| Emerald Green Glass (Bottle Glass) | |
|---|---|
| Chemical | % by Weight |
| $SiO$ | 72.26 |
| $Na_2O$ | 13.11 |
| $CaO$ | 10.47 |
| $Al_2O_3$ | 2.05 |
| $K_2O$ | 0.93 |
| $MgO$ | 0.78 |
| $Fe_2O_3$ | 0.205 |
| $Cr_2O_3$ | 0.12 |
| $SO_2$ | 0.08 |

Emerald green glass has a softening point of approximately 730° C. or 1346° F.

Glass cullet as a filler for polyurethane compositions has several advantages over other types of filler. Glass cullet is odorless and non-toxic. Glass cullet is readily available from commercial sources. Glass cullet can be ground into desired particle sizes and individual glass types; i.e., flint, plat, E. glass, etc., are relatively easily separated from recycled glass sources. Glass cullet useful in the present invention is commercially available from Strategic Materials, Inc., Houston, Tex.; TriVitro, Kent, Wash.; and Universal Ground Cullet, Brook Park, Ohio.

Polyurethane compositions are well known to those skilled in the art. Polyurethane compositions in accordance with the present invention may be solid or cellular, i.e., foamed or frothed, rigid or flexible. The particular composition of the polyurethane-forming components is not a critical aspect of the present invention.

Polyurethane is a polymerization product of a polyol component, an isocyanate component, water (optional) and a catalyst system that promotes a polymerization reaction between the isocyanate component and the polyol component to form the polyurethane. Conventional practice in the art is to form an isocyanate mixture, referred to as SIDE A; and to form a mixture of polyols, chain extenders, cross-linking agents, fillers, blowing agents, surfactants, catalysts etc., commonly referred to as SIDE B. The SIDE A component and the SIDE B component are mixed together at a desired ratio to form the polyurethane polymer. See U.S. Pat. No. 5,159,012 the disclosure of which is incorporated herein by reference.

The polyol component may contain either a single polyol or a mixture of two or more polyols. The specific polyols useful in the manufacture of polyurethane elastomers are well known in the art and include aliphatic, alicyclic and aromatic polyols. More specifically, the polyol component useful in this invention has an average functionality within the range of 2–8, preferably within the range of 2–3, and an average molecular weight of from about 900 to about 9000, preferably from about 1000 to about 6000. The polyol component may contain isomeric and polymeric polyols. Additionally, the polyol component has a hydroxyl number of less than about 150, preferably less than about 115.

The preferred polyols suitable for use in this process are ethylene glycol; diethylene glycol; propylene glycol; dipropylene glycol; glycerine; sucrose; butylene glycol; polyether polyols derived from ethylene oxide, propylene oxide, and mixtures of such oxides; polyether polyols derived from propylene oxide and capped with ethylene oxide; polyethylene glycol; polypropylene glycol; polybutylene glycol; 1,2-polydimethylene glycol; polydecamethylene glycol and mixtures of the above polyols.

The polyurethane composition can be either foamed or unfoamed. In those instances where foaming is desired, such can be accomplished by using an inert gas frothing technique, a volatile liquid blowing agent technique, a chemically blown (water) technique or combinations thereof, in conjunction with a surface active agent, such as the commercially available block polysiloxane-polyoxyalkylene copolymers.

Chemical blowing of the polyurethane composition, if desired, is effected by controlling the catalyst system, the water concentration and the isocyanate level. Generally, water is present in the reaction mixture from between approximately 0.01 to 5.0 parts per hundred parts of polyol, preferably between 0.1 parts and 2 parts, over and above the water normally present in the reaction mixture. The catalyst system not only must effect rapid curing but also must control formation of carbon dioxide resulting from the reaction of water and isocyanate. Blowing should be controlled to effect expansion between about 5% and 200%, preferably between approximately 7% and 100%, so that a carpet yarn loop back stitch is saturated with reactants and the reactants expand sufficiently prior to curing. Suitable catalysts are those which promote polyurethane formation and concurrently promote the blowing reaction. Preferred catalysts are organic metal compounds, amines, and metal soaps, such catalysts include dibutyl tin dilaurate and stannous octanoate.

The isocyanate component may contain either a single isocyanate or a mixture of two or more isocyanates. The specific isocyanates useful in the manufacture of polyurethane polymers are well known in the art and include aliphatic, alicyclic and aromatic isocyanates. Preferred isocyanates have an average functionality within the range of 2–8, preferably within the range of 2–5. Examples of preferred isocyanates are 2,4-toluene diisocyanate; 2,6-toluene diisocyanate; 1,6-hexamethylene diisocyanate; naphthalene-1,4-diisocyanate; diphenyl methane 4,4'-diisocyanate; 4,4'-diphenylene diisocyanate; 3,3'-dimethoxy biphenylene diisocyanate; polymeric forms of the above diisocyanates, diisocyanato carbodiimide modified diphenylmethane 4,4'-diisocyanate (MDI), isocyanate terminated prepolymers, and mixtures of the foregoing. The isocyanate component (Side A) usually is employed in stoichiometric excess to assure complete reaction with the functional groups of the polyol and with any water which may be present. Preferably, from 20 to 80 parts isocyanate per one hundred parts of polyol are used in the reaction mixture.

Other polyurethane compositions that are useful in the present invention are disclosed in, U.S. Pat. Nos. 5,508,315 (discloses using fly ash as reinforcing particles in a highly filed polyurethane foam); 3,917,547 (discloses adding fly ash to foamed flexible polymeric compositions, especially polyurethanes, to improve and extend the physical characteristics of the foam); 3,830,776 and 4,661,533 (discloses a highly filled polyurethane foam containing fly ash as an inorganic filler) (all of the foregoing patents are incorporated herein by reference).

A general polyurethane formulation that is useful in the present invention is shown in Table VII below:

TABLE VII

| Ingredient | Parts |
| --- | --- |
| Polyol A (triol) | 100 |
| Polyol B (diol) | |
| Polyol C (Chain extender) | |
| Surfactant (silicon glycol copolymer) | 0–2 |
| Water | 0–2 |
| Other filler | 0–400 |
| Additives | 0–50 |
| Catalysts | 0.002–3 |
| Isocyanate | sufficient (index 70–130) |

In order to prepare a filled polyurethane formulation, glass cullet is added to the polyurethane-forming components. The glass cullet can be added in amounts between approximately 5% and 95% by weight. The polyurethane compositions of the present invention can be used to make polyurethane foams having densities of from approximately 7 to 80 pounds per cubic foot.

It has been discovered as a part of the present invention that not all glass cullet can be used to satisfactorily produce polyurethane products. Specifically, the glass cullet used in the present invention must not be derived from plate glass or soda lime glass. Types of glass cullet that are useful in the present invention include E. glass, borosilicate glass, flint glass, amber glass and emerald glass. However, particularly preferred sources of glass cullet for use in the present invention are bottle glass; i.e., flint glass, amber glass, and emerald green glass. An especially preferred source of glass cullet for use in the present invention is tri-color glass which is a mixture of equal amounts of flint glass, amber glass, and emerald green glass.

Irrespective of the source of the glass cullet, the glass cullet useful in the present invention should have a pH in deionized water of not greater than 8.4. Preferably, the glass cullet useful in the present invention should have a pH in deionized water of about 7 to 8.4. Glass cullet from e. glass, borosilicate glass, flint glass, amber glass and emerald glass satisfies this condition. However, glass cullet from plate glass does not satisfy this requirement, and, therefore, is not suitable for use in the present invention.

It has also been discovered as a part of the present invention that the average size of the particles of the glass cullet is a critical element of the present invention. In determining the particle size of the glass cullet useful in the present invention, three factors must be balanced: reaction rate, viscosity and stability. The smaller the particle size of the glass cullet, the greater the catalytic effect of the glass cullet, and, therefore, the faster the polyurethane forming reaction will occur. On the other hand, the smaller the glass cullet particle size, the higher the viscosity of the Side B composition. Furthermore, the smaller the particle size, the more stable the polyurethane composition; i.e., the glass cullet filler will remain in suspension in the Side B composition.

The glass cullet useful in the present invention should have an average particle size such that the Side B composition has a viscosity of approximately 1,000 to 13,000 cps at 25° C. Stated another way, the glass cullet useful in the present invention should have an average particle size not greater than 100 mesh (149 microns) and not less than 325 mesh (44 microns). Preferably, the glass cullet useful in the present invention should have an average particle size not greater than 100 mesh and not less than 200 mesh.

The following examples are illustrative of the present invention and are not intended to limit the scope of the invention as set forth in the appended claims. All temperatures are in degrees Fahrenheit and all percentages are by weight unless specifically stated otherwise.

EXAMPLE 1

Polyurethane compositions were prepared according to the formulas shown in Table VIII below:

TABLE VIII

| Ingredient | Formula A | Formula B | Formula C |
| --- | --- | --- | --- |
| High (~6,000) molecular weight triol | 45.0 | 45.0 | 45.0 |
| High (~6,000) molecular weight diol | 45.0 | 45.0 | 45.0 |
| Low (~400) molecular weight diol | 10.0 | 10.0 | 10.0 |
| Surfactant | 2.0 | 2.0 | 2.0 |
| Calcium Carbonate | 65.0 | 65.0 | 65.0 |
| Tri Color Glass Cullet | 35.0 | 0 | 0 |

TABLE VIII-continued

| Ingredient | Formula A | Formula B | Formula C |
|---|---|---|---|
| E-Glass Cullet | 0 | 35.5 | 0 |
| Plate Glass Cullet | 0 | 0 | 35.5 |
| Tin Catalyst | 1.0 | 1.0 | 1.0 |
| Isocyanate 344kd | Sufficient 70–100) | Sufficient 70–100) | Sufficient 70–100) |

Three separate mechanically frothed formulations were prepared according to the foregoing formula, except that three different sources of glass cullet were used. The three different formulations were prepared with glass cullet from three-color glass; i.e., a mixture of equal amounts of flint, amber and emerald green glass; E. glass and plate glass.

In order to be commercially useful, the polyurethane formulations in accordance with the present invention should have a reactivity of greater than 5 minutes, should have a cure time of less than 130 seconds and should be stable for at least 14 days. The properties of each of the three formulations is shown in Table IX below:

TABLE IX

| Property | Tri-color Glass | E. Glass | Plate Glass |
|---|---|---|---|
| Reactivity | 15+ minutes | 15+ minutes | <5 minutes |
| Cure | 35 seconds | 35 seconds | 30 seconds |
| Stability: | −80 mesh: settles in 7 days | −100 mesh: very stable 14 days | −80 mesh: settles in 7 days |
|  | 100–200 mesh: very stable 14 days | 100–200 mesh: very stable 14 days | 100–200 mesh: very stable 14 days |
|  | −200 mesh: stable 14 days, but viscosity is too high | −200 mesh: stable 14 days, but viscosity is too high | −140 mesh: stable 14 days, but viscosity is too high |

Viscosity "too high" as used in Table IX above means that the uncured polyurethane composition had a viscosity greater than is commercially practical to pump through hoses. Generally, the polyurethane compositions of the present invention should have a viscosity of less than 18,000 cps at 25° C.; preferably less than 13,000 cps at 25° C.; and especially preferred approximately 3,000 to 10,000 cps at 25° C.

EXAMPLE 2

Polyurethane compositions were prepared according to the formulas shown in Table X below:

TABLE X

| Ingredient | Formula A | Formula B | Formula C |
|---|---|---|---|
| High (~6,000) molecular weight triol | 50.0 | 50.0 | 50.0 |
| High (~6,000) molecular weight diol | 45.0 | 45.0 | 45.0 |
| Low (~400) molecular weight diol | 5.0 | 5.0 | 5.0 |
| Calcium Carbonate | 130.0 | 130.0 | 130.0 |
| Tri Color Glass Cullet | 70.0 | 0 | 0 |
| E-Glass Cullet | 0 | 70.0 | 0 |
| Plate Glass Cullet | 0 | 0 | 70.0 |
| Tin Catalyst | 1.0 | 1.0 | 1.0 |
| Isocyanate 344kd | Sufficient 70–100) | Sufficient 70–100) | Sufficient 70–100) |

The physical properties of the elastomeric polyurethane made from the foregoing compositions is shown in Table XI below.

TABLE XI

| Physical Property (Average) | Tri-color Glass | E. Glass | Plate Glass |
|---|---|---|---|
| Tensile | 85 lbs/in$^2$ | 75 lbs/in$^2$ | 74 lbs/in$^2$ |
| Tear | 9.50 lbs/in | 9.30 lbs/in | 9.6 lbs/in |
| Elongation | 80% | 80% | 90% |
| Compression set | 3.5% | 3.0% | 17% |
| Compression resistance | 10 lbs/in$^2$ | 9 lbs/in$^2$ | 7 lbs/in$^2$ |
| Asker C | 30 | 29 | 29 |

Nine formulations were prepared in accordance with the formulation shown in Table X. Each formulation included glass cullet from one of three sources and each formulation had a different particle size range. Particle sizes ranged from 80 mesh to less than 325 mesh in one sample, less than 100 mesh to 200 mesh in another sample and less than 200 mesh in yet another sample. The results of tests measuring cure, reactivity and pH are shown in Table XII below. The cure was measured by placing ten grams (+/−0.1) in a tin container which was then placed on a hot plate set at 275° F. The reactivity was measured using a thermometer and a Brookfield viscometer, Model DV-II.

TABLE XII

| Glass Cullet | Average pH | Average Cure | Average Reactivity |
|---|---|---|---|
| Tri-color (80 × −325 mesh) | 7.9–8.4 | 35 seconds | 15–18 minutes |
| Tri-color (−100 × 200 mesh) | 8.0–8.4 | 33 seconds | 15–18 minutes |
| Tri-color (−200 mesh) | 8.4–8.6 | 30 seconds | 14–16 minutes |
| E Glass (80 × −325 mesh) | 7.6–8.2 | 35 seconds | +20 minutes |
| E Glass (−100 × 200 mesh) | 7.6–7.9 | 35 seconds | +20 minutes |
| E Glass (−200 mesh) | 7.7–8.2 | 34 seconds | +20 minutes |
| Plate Glass (80 × −325 mesh) | 9.2–9.9 | 28 seconds | <5 minutes |
| Plate Glass (−100 × 200 mesh) | 9.2–9.5 | 26 seconds | <4 minutes |
| Plate Glass (−200 mesh) | 9.5–9.9 | 22 seconds | ~2 minutes |

The 80 mesh glass cullet settled out too fast, the −100× 200 mesh glass cullet provided ideal stability and the −200 mesh glass cullet produced a stable but unacceptably viscous formula. Furthermore, for the formulations containing plate glass cullet, the pH was too high and the reactivity and cure were too fast thereby making the formula uncontrollable for commercial applications.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A composition comprising at least one polyol, an isocyanate, a catalyst and glass cullet, said glass cullet having an average particle size of not greater than 100 mesh and not less than 325 mesh, wherein said glass cullet has a pH in deionized water of up to approximately 8.4 and wherein the glass cullet is derived from recycled glass, wherein said recycled glass cullet is not derived from plate glass or soda lime glass.

2. The composition of claim 1, wherein said glass cullet has a pH in deionized water of approximately 7 to 8.4.

3. The composition of claim 1, wherein said glass cullet comprises approximately 5 to 95 weight percent of said composition.

4. The composition of claim 1, wherein said composition has a density after curing of approximately 7 to 80 pounds per cubic foot.

5. The composition of claim 1, wherein said glass cullet is derived from bottle glass.

6. The composition of claim 1, wherein said glass cullet is derived from flint glass, amber glass, emerald green glass, borosilicate glass, E. glass or mixtures thereof.

7. The composition of claim 1, wherein said glass cullet is derived from tri-color glass.

8. The composition of claim 1, wherein said composition is frothed or foamed.

9. The composition of claim 1, wherein said composition forms an elastomer.

10. The composition of claim 1, wherein said glass cullet has an average particle size of 100 to 200 mesh.

11. The composition of claim 10, wherein said composition is frothed or foamed.

12. The composition of claim 10, wherein said composition forms an elastomer.

13. A method comprising the steps of
adding to a composition comprising at least one polyol, an isocyanate, and a catalyst an amount of glass cullet, said glass cullet having an average particle size of not greater than 100 mesh and not less than 325 mesh, wherein said glass cullet has a pH in deionized water of up to approximately 8.4 and wherein the glass cullet is derived from recycled glass, wherein said recycled glass cullet is not derived from plate glass or soda lime glass.

14. The method of claim 13, wherein said glass cullet has an average particle size of 100 to 200 mesh.

15. The method of claim 13, wherein said glass cullet has a pH in deionized water of approximately 7 to 8.4.

16. The method of claim 13, wherein said glass cullet comprises approximately 5 to 95 weight percent of said composition.

17. The method of claim 13, wherein said composition has a density after curing of approximately 7 to 80 pounds per cubic foot.

18. The method of claim 13, wherein said glass cullet is derived from post-consumer bottle glass.

19. The method of claim 13, wherein said glass cullet is derived from flint glass, amber glass, emerald green glass, borosilicate glass, E. glass or mixtures thereof.

20. The method of claim 13, wherein said glass cullet is derived from tri-color glass.

21. The method of claim 13, wherein said composition is frothed or foamed.

22. The method of claim 13, wherein said composition forms an elastomer.

23. A polyurethane polymer comprising:
a Side B composition comprising at least one polyol, a catalyst and glass cullet, said glass cullet having an average particle size of not greater than 100 mesh and not less than 325 mesh; and wherein said glass cullet has a pH in deionized water of up to approximately 8.4 and wherein said glass cullet is derived from recycled glass, wherein said recycled glass cullet is not derived from plate glass or soda lime glass; and
a Side A composition comprising at least one isocyanate at an index between 0.8 and 1.20.

24. A composition comprising at least one polyol, an isocyanate, a catalyst and glass cullet, said glass cullet having an average particle size of not greater than 100 mesh and not less than 325 mesh, wherein said glass cullet has a pH in deionized water of up to approximately 8.4 and wherein said glass cullet is derived from post-consumer bottle glass, wherein said glass cullet is not derived from plate glass or soda lime glass.

25. composition comprising at least one polyol, an isocyanate, a catalyst and glass cullet, said glass cullet having an average particle size of not greater than 100 mesh and not less than 325 mesh, wherein said glass cullet has a pH in deionized water of up to approximately 8.4 and wherein said glass cullet is derived from flint glass, amber glass, emerald green glass, borosilicate glass, E. glass or mixtures thereof.

26. A composition comprising at least one polyol, an isocyanate, a catalyst and glass cullet, said glass cullet having an average particle size of not greater than 100 mesh and not less than 325 mesh, wherein said glass cullet has a pH in deionized water of up to approximately 8.4 and wherein said glass cullet is derived from tri-color glass.

27. An article made from the composition of claim 1.
28. An article made from the composition of claim 10.
29. An article made from the composition of claim 2.
30. An article made in accordance with the method of claim 13.
31. An article made from the polyurethane plymer of claim 23.
32. An article made from the composition of claim 24.
33. An article made from the composition of claim 25.
34. An article made from the composition of claim 26.

* * * * *